United States Patent [19]

Casani et al.

[11] 4,078,426

[45] Mar. 14, 1978

[54] ANEMOMETER

[75] Inventors: John R. Casani, Altadena; Edwin Pounder, La Canada, both of Calif.

[73] Assignee: Transdynamics, Inc., Burbank, Calif.

[21] Appl. No.: 714,136

[22] Filed: Aug. 13, 1976

Related U.S. Application Data

[63] Continuation of Ser. No. 623,407, Oct. 7, 1975, abandoned, which is a continuation of Ser. No. 522,685, Nov. 11, 1974, abandoned, which is a continuation of Ser. No. 299,032, Oct. 19, 1972, abandoned.

[51] Int. Cl.$^2$ ............................................. G01W 1/02
[52] U.S. Cl. ..................................................... 73/189
[58] Field of Search ............... 73/189, 229, 230, 231; 308/227, 228, 237 A

[56] References Cited

U.S. PATENT DOCUMENTS

| | | | |
|---|---|---|---|
| 1,050,350 | 1/1913 | Davis | 73/189 |
| 1,122,800 | 12/1914 | Pflueger | 308/163 |
| 1,366,132 | 1/1921 | Pitkin | 308/163 |
| 2,390,384 | 12/1945 | Poole | 73/189 |
| 3,101,615 | 8/1963 | Pavone | 73/231 R |
| 3,345,869 | 10/1967 | Karlby et al. | 73/231 R |
| 3,623,835 | 11/1971 | Boyd | 73/231 R |
| 3,707,872 | 1/1973 | Masson | 73/231 R |
| 3,713,336 | 1/1973 | Bernstein | 73/189 |

FOREIGN PATENT DOCUMENTS

| | | | |
|---|---|---|---|
| 59,028 | 1/1922 | Germany | 308/228 |

*Primary Examiner*—Anthony V. Ciarlante
*Attorney, Agent, or Firm*—Christie, Parker & Hale

[57] ABSTRACT

An anemometer includes a rotor mounted to spin about a vertical axis in response to wind being directed against it, and a cage having a plurality of circumferentially spaced apart, vertically disposed vanes surrounding the rotor. The vanes deflect the normal flow of air to produce an asymmetrical airflow pattern across the face of the rotor to cause the rotor to spin about its axis. A transducer senses the rotational speed of the rotor and converts it into a signal proportional to airspeed. In one form of the invention, the cage is fixed, and in another embodiment the cage is attached to a windvane to rotate with the windvane relative to the rotor. The windvane senses the direction of the wind, and a second transducer converts the rotational motion of the windvane into a signal proportional to wind direction. Preferably, the windvane includes a horizontally disposed, planar airfoil surface for deflecting the normal flow of air to increase the velocity of the air directed against the cage and rotor in proportion to increases in the angular deviation between the rotor axis and the general direction of the wind. Preferably, the rotor is a paddle wheel of relatively low mass on a shaft which is engaged with a pair of journal bearings. A low friction thrust bearing held in contact with a pointed end of the rotor shaft handles the weight of the rotor, while the journal bearings handle the aerodynamic loads on the rotor.

33 Claims, 9 Drawing Figures

FIG_4

FIG_9

FIG_5

ANEMOMETER

CROSS REFERENCE TO RELATED APPLICATIONS

This is a continuation of application Ser. No. 623,407, filed Oct. 7, 1975 now abandoned, which, in turn, is a continuation of Ser. No. 522,685, filed Nov. 11, 1974, now abandoned, which in turn is a continuation of application Ser. No. 299,032, filed Oct. 19, 1972, now abandoned.

BACKGROUND OF THE INVENTION

This invention relates to airspeed measuring devices, and more particularly to an improved anemometer which is especially suitable for meterological use and for use in the navigation of sailboats.

Conventional anemometers include a rotor with long radially extending spokes, and cups attached to the spokes for catching the wind and causing the rotor to spin. The speed of the wind is proportional to the revolutions of the rotor in a given period of time, and a pickup coupled to the rotor converts the speed of the rotor to a signal proportional to airspeed.

The conventional cup-type anemometer has several disadvantages. For example, when the wind blows at an angle relative to the rotational axis of the anemometer, the anemometer output generally varies with the wind angle for any given true wind speed. Thus, when the conventional anemometer is used on a sailboat, its output tends to be non-linear in response to changes in wind speed since such change also causes the boat to heel (i.e., assume a tilted position relative to a vertical plane). On some occasions, the cup-type anemometer speeds up or slows down significantly when the wind angle changes, thereby producing large wind speed errors.

A further disadvantage is that the wind speed measurement produced by many prior art anemometers contains a dead zone region for a certain range of low air speeds. Moreover, the rotor bearings of prior art anemometers are subjected to continuous combined wind loading and loading due to the weight of the rotor itself, which limits the life of the anemometer to such an extent that replacement of a bearing is required one or more times during the desired working life of the instrument.

SUMMARY OF THE INVENTION

This invention provides an anemometer which limits dead zone from its output to such an extent that airspeed readings are provided at substantially lower speeds than those produced by conventional anemometers. The anemometer also is capable of producing an accurate measurement of true wind speed independently of the angle between the anemometer axis of rotation and the general direction of the wind. Moreover, the anemometer includes a bearing arrangement which significantly prolongs the useful life of the anemometer when compared with the performance of the conventional cup-type anemometer.

Briefly, the anemometer includes a rotor adapted to rotate about an axis and having a frontal surface spaced from its rotational axis for catching wind directed against it so the rotor will spin about its axis. The rotational speed of the rotor is converted into a signal proportional to instantaneous airspeed. In a preferred form of the invention, the rotor is surrounded by a cage having a plurality of spaced apart, upright vanes for deflecting the normal flow of air incident upon them and producing an airflow pattern across the rotor which causes the rotor to spin about its axis.

Since the cage alters the normal wind flow to generate the rotational motion of the motor, the anemometer rotor does not require long spokes with cup attached for catching wind to generate rotational torque. Thus, the rotor used in the anemometer of this invention can be simple paddle wheel, or other similar rotational device which can be substantially lighter in weight and much smaller than the conventional cup-type anemometer. The reduced size and weight of the rotor permits the use of a low-friction bearing arrangement, to be described in greater detail below, which is a factor in extending the useful life of the anemometer and reducing dead zone in the anemometer output.

In one form of the invention, the anemometer rotor is surrounded by a fixed cage having vanes which are uniformly spaced apart and arranged in a symmetrical pattern. Wind blowing from any direction is deflected by the vanes to generate an airflow pattern which causes the rotor to spin on its axis.

In another form of the invention, the cage is attached to a rotatable windvane so the cage and windvane rotate as a unit in response to changes in the direction of the wind. The windvane preferably includes an airfoil surface located adjacent to the cage for deflecting the normal flow of air so as to alter the velocity of air incident upon the cage and rotor in proportion to the angular deviation between the rotor axis and the general direction of the wind. Thus, the airfoil surface cancels the airspeed errors normally present in prior art anemometers when the wind blows at various angles relative to the anemometer axis of rotation.

Preferably, the anemometer rotor rotates about an elongated shaft. The rotational axis of the rotor is constrained by a pair of spaced apart journal bearings engaged with the shaft. A low-friction thrust bearing is maintained in contact with a pointed end of the rotor shaft. This bearing arrangement separates the loads normally present on the anemometer during use. The thrust bearing handles loading caused by the weight of the rotor, and the journal bearings handle aerodynamic loads on the rotor. Since the weight of the rotor is not imposed on the journal bearings, low-friction dry journal bearings can be used to support the rotor shaft. Thus, the rotational friction developed by the rotor, when subjected to aerodynamic loading, is reduced substantially. This allows the rotor to spin when acted upon by relatively low airspeeds, and thereby substantially reduces dead zone present in the anemometer output.

BRIEF DESCRIPTION OF THE DRAWINGS

These and other aspects of the invention will be more fully understood by referring to the following detailed description and the accompanying drawings in which.

DETAILED DESCRIPTION OF THE PREFERRED EMBODIMENT

Figure 1:
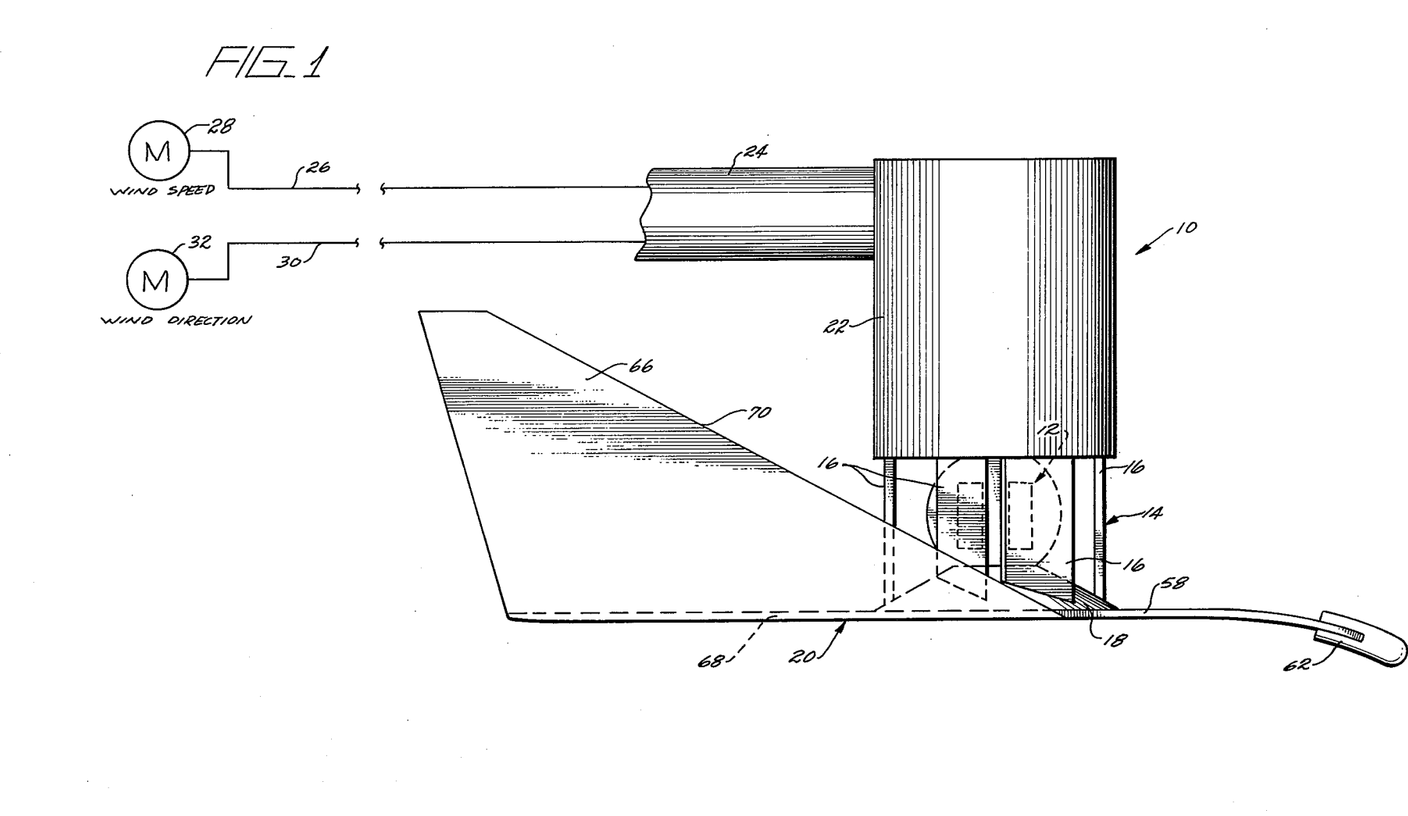
FIG. 1 is an elevation view showing the improved anemometer of this invention.
Figure 2:
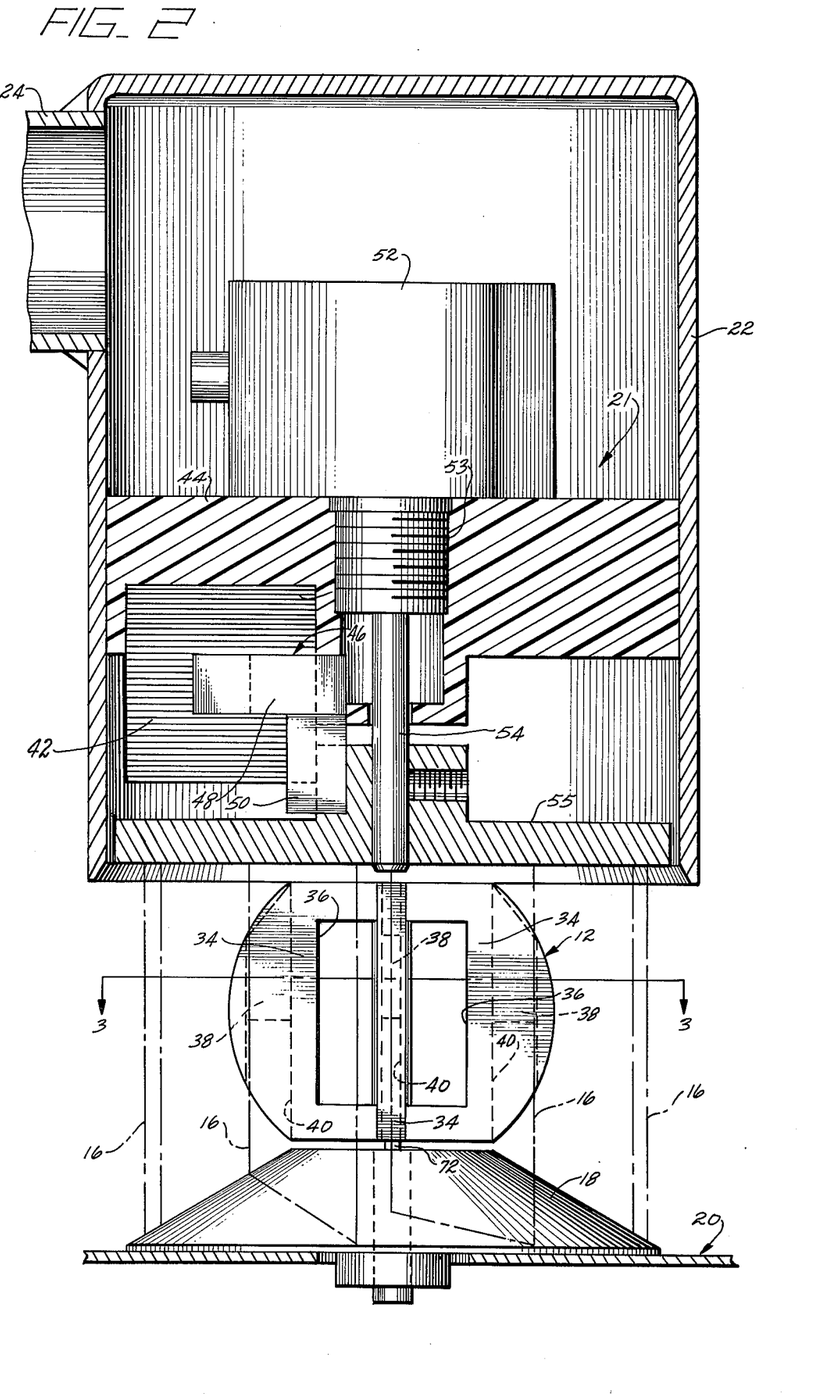
FIG. 2 is a fragmentary elevation view, partly in section, showing a rotor and transducer assembly for the anemometer of FIG. 1.

Referring to FIGS. 1 and 2, an anemometer 10 includes a rotatable paddle wheel or rotor 12 adapted to spin about a vertical axis in response to air flow acting on it. A cage 14 having several circumferentially spaced apart and vertically disposed vanes 16 surrounds the paddle wheel. The bottom of the cage is attached to a base 18 shaped as an upwardly tapering truncated cone. Base 18 is carried by a rotatable windvane 20 adapted to align itself with the direction of the wind. Thus, changes in the direction of the wind automatically cause the windvane and cage to rotate as a unit relative to the paddle wheel.

A pickup assembly 21 located in a housing 22 above the paddle wheel converts the rotational speed of the paddle into a corresponding signal representing wind speed, and also converts the angular orientation of the windvane into a signal representing the instantaneous direction of the wind. A conduit 24 leading from housing 22 carries several electrical leads (one of which is represented at 26) for connection to a meter 28 indicating instantaneous wind speed, and several electrical leads (one of which is represented at 30) for connection to a meter 32 indicating the instantaneous direction of the wind.

Figure 3:
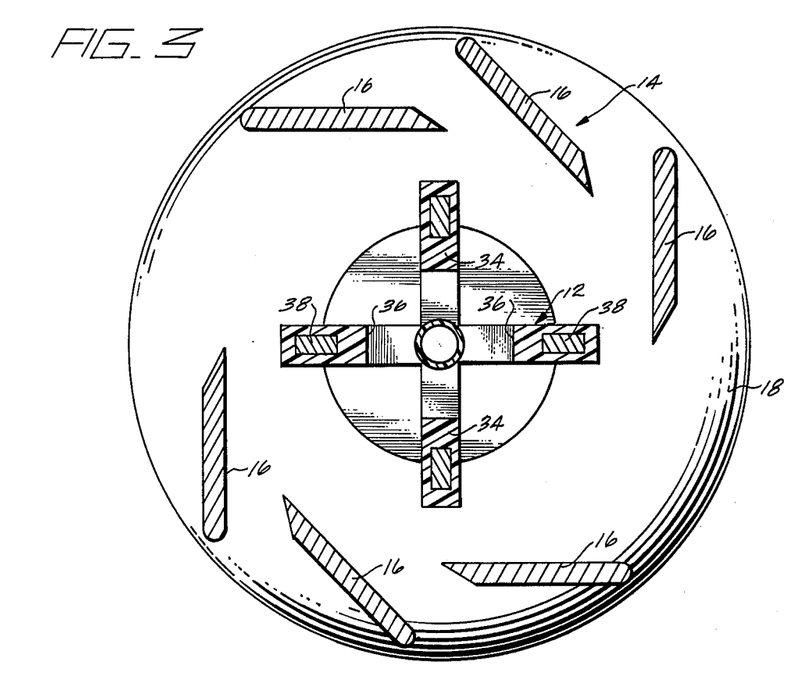
FIG. 3 is a sectional plan elevation view taken on line 3—3 of FIG. 2.

As shown best in FIGS. 2 and 3, paddle wheel 12 includes four radially extending blades 34 spaced 90° apart from one another. Each blade includes a rectangular opening 36 extending through it, and a magnetic piece 38 carried near the top of the blade in an internal bore 40 extending through the blade. The paddle wheel can include two or more blades, and magnetic pieces can be carried in one blade, or more. However, it is preferred to use the illustrated four-blade paddle wheel with a separate magnetic piece embedded in each blade. Preferably, the paddle wheel is made of plastic so it will be rigid, yet relatively light in weight.

Motion of the air past the paddle wheel causes the paddle wheel to rotate and move the embedded magnetic pieces past the pickup in housing 22. Various forms of pickup units may be used, the preferred arrangement being illustrated in FIG. 2. A coil 42 is mounted in a fixed position by a block 44. A U-shaped pole piece 46 is disposed around the coil. One horizontally disposed leg 48 of the pole piece is shown in FIG. 2. The pole piece also has a pair of downwardly extending legs 50, one on each side of the coil. As the paddle wheel rotates, north-south magnets of each adjacent pair of rotating blades become aligned below the two legs 50 of the pole pieces. The core (not shown) of coil 42 and the pole pieces provide a magnetic flux path, and the movement of the magnetic pieces past legs 50 of the pole pieces produces a change in the flux present in the flux path. This flux change produces a change in electrical output of the coil 42 which is connected by leads 26 to a transducer (not shown) for converting the electrical output to a corresponding signal representing wind speed. This signal is then fed to meter 28.

The pickup unit also includes a potentiometer 52 mounted on block 44 by a threaded coupling 53. The potentiometer includes a rotor (not shown) connected to a vertically disposed and downwardly extending rotatable shaft 54. A horizontally disposed plate 55 carried on the bottom of shaft 54 rotates with the shaft. Plate 55 can be in the shape shown in FIG. 2, or it can be shaped as a downwardly tapering truncated cone. The tops of vanes 16 of cage 14 are attached to the bottom of the plate so that the windvane 20, cage 14, and plate 55 rotate as a unit with changes in wind direction. The rotor of shaft 54 is coupled to a potentiometer wiper arm (not shown) which rotates relative to the potentiometer resistance (not shown) to produce an electrical output voltage representing the instantaneous direction of the wind. The potentiometer output is coupled to meter 32 via electrical lead 30 to display the instantaneous wind direction.

The electrical outputs from coil 42 and potentiometer 52 also can be coupled to other instrumentation using wind speed or wind direction, respectively, as an input.

The detailed construction of cage 14 is shown best in FIG. 3. The circumferentially spaced apart vanes 16 which surround the paddle wheel are arranged with respect to each other so that they deflect the wind incident upon the cage, regardless of the wind's direction (azimuth), and direct the wind so it passes through the cage and strikes the frontal surface of the paddle wheel at a point spaced laterally from the paddle wheel axis of rotation. This deflection of the wind produces a rotational moment on the paddle wheel which causes it to spin about its axis.

The conventional cup-type wind sensor has a relatively large mass, because of the radially mounted cups which are necessary to produce rotational torque when exposed to wind pressure. Cage 14 makes it possible to use a rotor of substantially less mass than the cup-type anemometer, because cups mounted on long spokes are not necessary to generate rotational motion of the anemometer rotor. Thus, the symmetrical open paddle wheel 12 can be used as the wind sensor, and is especially advantageous because of its relatively low mass and small size. Because of the reduced size and weight of the paddle wheel, a relatively small load is exerted on the bearing which supports the weight of the paddle wheel, which in turn aids in prolonging the useful life of the anemometer. The lighter weight paddle wheel also spins at a faster rate than the typically larger cup-type anemometer, which generates a higher frequency output signal, and therefore an output of greater resolution.

Figure 4:
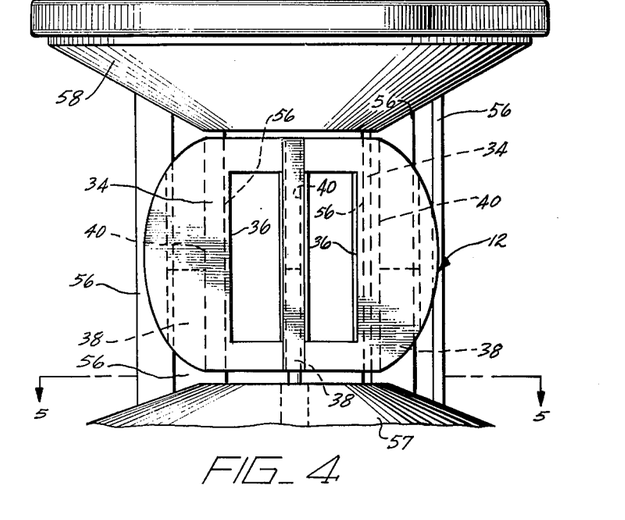
FIG. 4 is a fragmentary plan elevation view showing an alternate cage assembly for the anemometer rotor.
Figure 5:
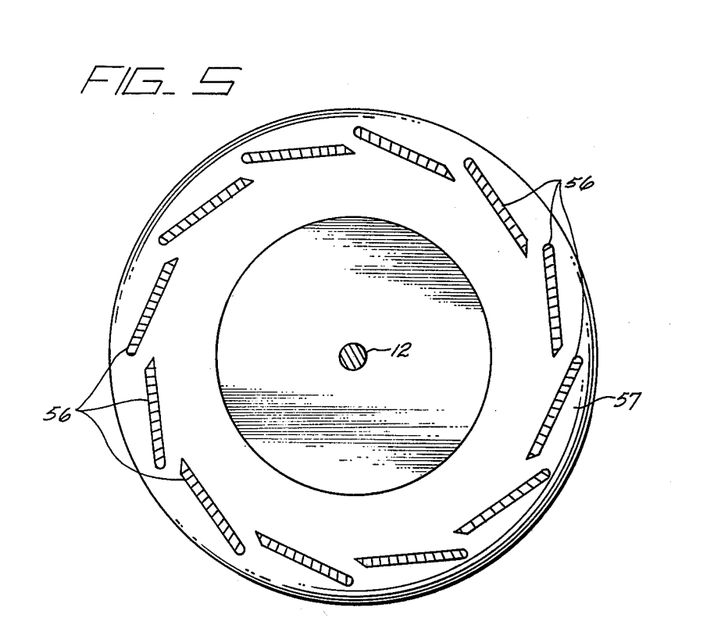
FIG. 5 is a plan elevation view taken on line 5—5 of FIG. 4.

FIGS. 4 and 5 show an alternate form of the cage and rotor assembly, in which rotor 12 is surrounded by a fixed cage having a plurality of circumferentially spaced apart, upright vanes 56 spaced uniformly apart and arranged in a symmetrical pattern shown best in FIG. 5. (The several vanes which front the rotor are not shown in FIG. 4 for clarity) Vanes 56 extend between a fixed base 57 shaped as an upwardly tapered truncated cone, and a fixed upper mounting block 58 shaped as a downwardly tapered truncated cone, the cooperating conical shaped base and upper mounting block being preferred because they aid in funnelling the flow of air through the cage to the rotor. The entire anemometer of FIG. 4 is not shown for the purpose of simplicity. Base 57 preferably provides a fixed downwardly opening cover for the top of a pick up assembly (not shown)

located below it. The pick up assembly measures wind velocity in substantially the same manner as pick up assembly 21. (The pick up assembly for the fixed cage does not measure wind direction, because no rotatable wind vane is used in conjunction with the cage).

Preferably, vanes 56 are relatively narrow in width, and a relatively large number, say ten to fourteen, of vanes are used.

During use of the anemometer, the uniform arrangement of vanes 56 causes airflow of a given velocity to spin the rotor at a substantially constant velocity independently of the direction from which the wind blows, thereby producing a substantially uniform output signal which is unaffected by changes in the instantaneous direction (azimuth) of the wind.

A further advantage of using a cage surrounding the rotor is that the cage protects the rotor from impact damage, or the like. The cage also makes it possible to use a more delicate bearing arrangement for mounting the rotor, as will become more clear from the description below.

Figures 6, 7:
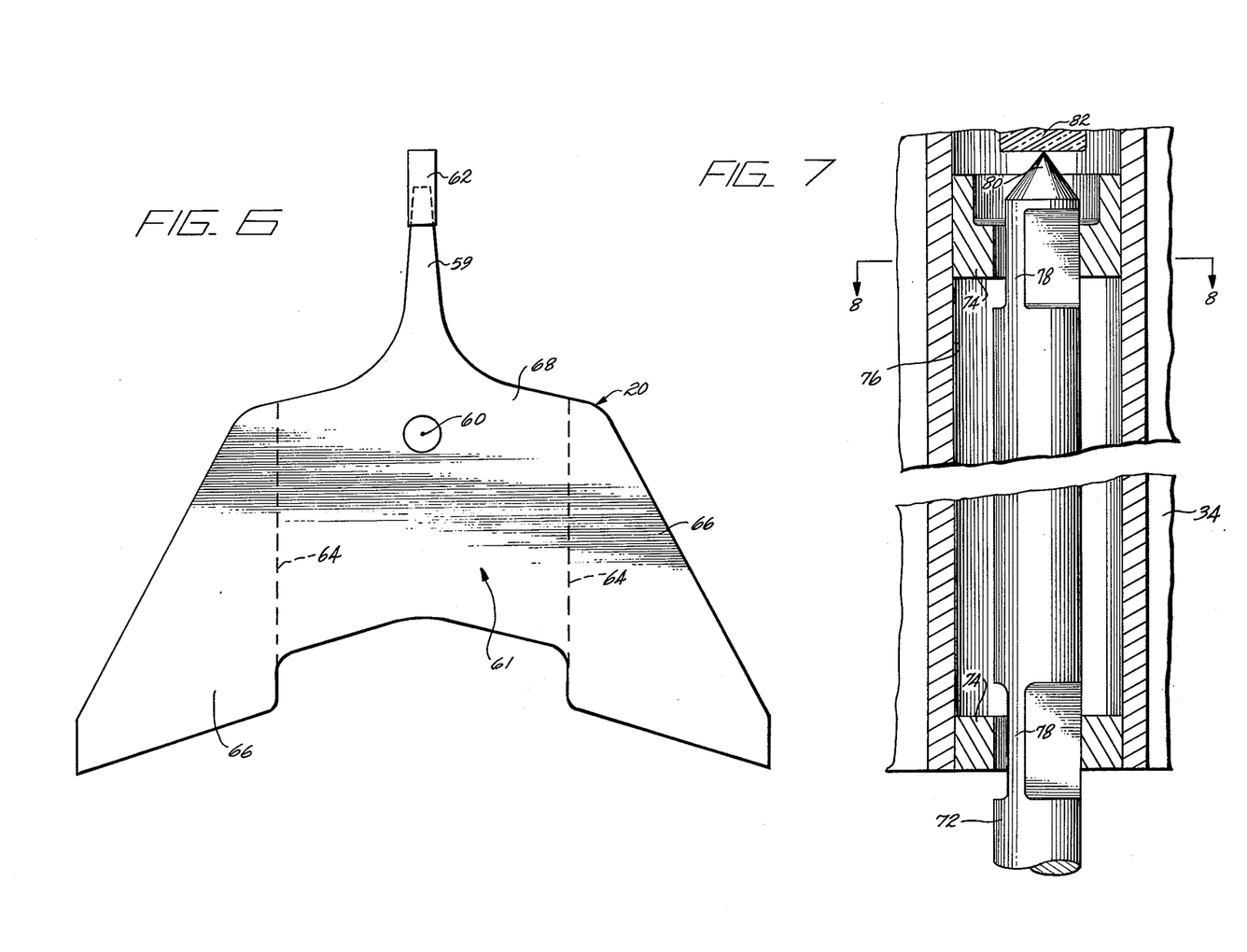
FIG. 6 is a plan elevation view showing an anemometer windvane in flat-form.
FIG. 7 is an enlarged fragmentary sectional elevation view of the rotor bearing assembly.

The detailed construction of windvane 20 is illustrated in FIG. 6, which shows a plan view of the windvane in flat-form. The windvane includes a narrow portion 59 forward of its vertical axis of rotation 60, and an enlarged, relatively V-shaped, flat section 61 having a center of area located to the rear of the windvane axis of rotation. The nose of pointer 59 has a slightly downwardly turned curvature, and a counterweight 62 is carried by the nose of the pointer. The outer portions of V-shaped section 61 are bent upwardly along fold lines 64 to form a pair of laterally spaced apart and parallel, upwardly projecting vanes 66. The central portion of V-shaped section 61 provides a flat, horizontally disposed airfoil surface 68 when the windvane is attached to the bottom of cage 12 and its base 18. Vanes 66 preferably diverge slightly relative to each other, but they also can be bent to lie in a vertical plane without producing any dramatically different functional result. As shown best in FIG. 1, the center of area of vanes 66 preferably is located to the rear of the windvane axis of rotation. Moreover, the vanes 66 preferably are characterized by a swept-back leading edge 70, the purpose of which will be described in detail below.

The anemometer of this invention is especially suitable for use as a wind speed and wind direction measuring device for sailboats. One problem with conventional anemometers used on sailboats is that they tend to produce an erroneous output when a sudden change in wind speed or direction causes the boat to heel, which in turn, causes the wind to strike the anemometer at an angle of greater than or less than 90° relative to the anemometer axis of rotation. Generally speaking, conventional anemometers produce a change in output in response to changes in the heeling angle, rather than producing an output which is a constant function of the true wind speed regardless of the heeling angle.

The windvane of this invention overcomes this prior art problem, because the planar horizontal airfoil surface 68 increases the speed of the air passing over it in proportion to increases in the angle between the rotor axis and the general direction of the wind (wind pitch angle). Thus, the windvane, in effect, cancels the error present in conventional anemometers by altering the speed of the wind incident upon the cage and paddle wheel so it is constantly proportional to the true wind speed for the envelope of wind pitch angles commonly encountered in sailboat use or meterological use. This produces an anemometer output which is substantially equal to the true wind speed, regardless of the instantaneous pitch angle of the wind.

Moreover, tests on the anemometer of this invention have shown that wind speed readings substantially proportional to the cosine of the wind pitch angle are generated when the paddle wheel and cage assembly is used without a wind-deflecting airfoil surface. Thus, the anemometer is especially useful in meteorological applications where the cosine function of wind speed is desired rather than a true speed wind reading.

The cosine error generated by the anemometer of this invention in response to changes in the wind pitch angle also can be adjusted by airfoil surface 68, in addition to being eliminated. By adjusting the size, shape, or location of the airfoil, the desired function of wind speed relative to a given wind pitch angle can be produced.

In use, it has been found that the swept-back profile of vanes 66 shown in FIG. 1 aids in producing an ideal response characteristic of the windvane, by reducing overshoot of the rotating windvane to a critically damped condition in response to changes in direction of the wind.

Figure 8:
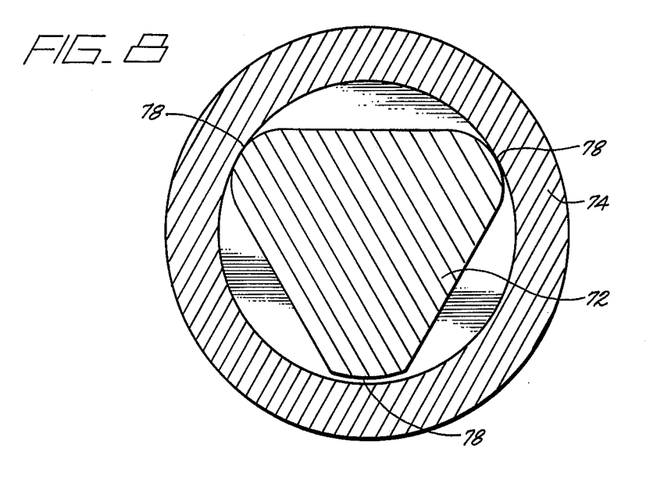
FIG. 8 is a sectional elevation view taken on line 8—8 of FIG. 7.

Paddle wheel 12 is mounted for rotation on a bearing arrangement illustrated best in FIGS. 7 and 8. The paddle wheel rotates on an upwardly extending rotatable shaft 72 supported on base 18. Shaft 72 is journaled in a pair of vertically spaced apart journal bearings 74 carried in a vertically disposed internal bore 76 extending along the axis of rotation of the paddle wheel. As shown best in FIG. 6, the portions of the shaft which contact the journal bearings are triangular in cross-section. Each triangular portion has three equidistantly spaced apart rounded lobes 78 fitted in the journal bearings, one of the lobes being ground off more than the others to provide sufficient clearance for journaling the shaft in bearings 74.

In use, the triangular cross-sections of the shaft 72 provide good rotational stability and essentially eliminate chatter when compared with a continuous cylindrical shaft having the same bearing load.

Shaft 72 terminates in a pointed end 80 which supports the weight of the paddle wheel. A thrust bearing 82 at the top of bore 76 rests on pointed end 80. Preferably, bearing 82 is a sapphire bearing, and pointed end 80 is made of stainless steel. The small radius of contact between pointed end 80 and bearing 82, and the relative hardness of the two bearing surfaces, aids in reducing substantially the friction torque due to rotor weight developed during rotation of the paddle wheel.

In conventional anemometers, the rotational friction torque developed in the rotor at low speeds due to the weight of the rotor dominates the friction torques produced by aerodynamic loading on the rotor. This produces a dead zone region, i.e. a region of zero output signal, for a relatively wide range of low airspeeds.

The bearing arrangement shown in FIGS. 7 and 8 substantially reduces dead zone in the output signal of the anemometer. The relatively low weight of the paddle wheel makes it possible for the bearing which supports its weight to have a relatively small area of frictional contact. (Thrust bearing 82 and the pointed end 80 of shaft 72 handle the load produced by the weight of the rotor). The friction torque developed during rotation of the paddle wheel is proportional to the radius of the contact area between the pointed end of shaft 72 and thrust bearing 82. This radius can be relatively small, and thereby reduce substantially the friction torque caused by the weight of the rotor.

Journal bearings 74 handle the aerodynamic loads imposed on the rotor. Since the weight of the rotor is not borne by the journal bearings, low-friction dry journal bearings can be used to support the rotor shaft. The combination of the low-friction journal bearings and low-friction thrust bearing makes it possible for the anemometer rotor to spin at relatively low speeds, thus, dead zone in the anemometer output at low speeds is substantially reduced.

The dead zone region in the anemometer output essentially can be controlled by the bearing arrangement of this invention. This is accomplished by altering the area of contact between thrust bearing 82 and pointed end 80. The area of contact has been reduced to the point where an anemometer output is produced for wind speeds as low as about two feet per second. However, according to the theory of operation of the present anemometer, it is believed possible to produce output signals for wind speeds lower than one foot per second.

Figure 9:
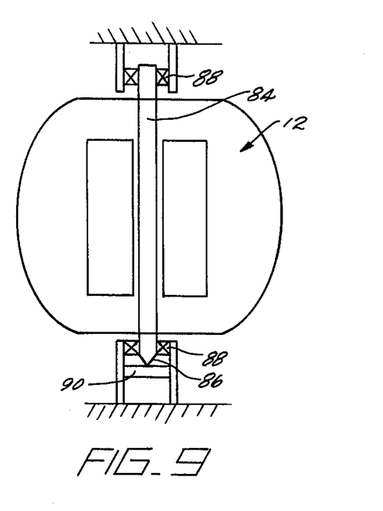
FIG. 9 is a schematic elevation view showing an alternate rotor bearing arrangement.

FIG. 9 shows an alternate bearing arrangement for rotor 12, in which the rotor is mounted on an elongated shaft 84 with a pointed bottom 86. The shaft is supported for rotation in a pair of vertically spaced apart, fixed external journal bearings 88 located above and below the rotor. The weight of the rotor is supported by a thrust bearing 90 on which pointed end 88 rests.

Other bearing arrangements for separating the bearing loads due to air dynamic forces from the bearing loads due to the weight of the rotor can be used without departing from the scope of the invention.

We claim:

1. An anemometer which includes a rotor mounted for rotation about an axis and having a frontal surface spaced from said axis for catching wind directed against it to cause the rotor to spin about its axis, whereby the speed with which the rotor spins can be converted into a signal proportional to air speed, and a cage mounted so it surrounds the rotor, the cage having a plurality of spaced apart vanes located about its pheriphery and positioned with respect to each other to deflect the flow of air incident upon them and produce an airflow pattern across the rotor frontal surface which causes the rotor to spin about its axis.

2. Apparatus according to claim 1 in which the rotor has plural angularly spaced apart planar surfaces oriented in a substantially symmetrical pattern.

3. Apparatus according to claim 1 including transducer means for sensing the speed with which the rotor spins and for converting the rotor speed into an indication of airspeed.

4. Apparatus according to claim 1 including a rotatable windvane attached to the cage, the windvane having an airfoil surface located adjacent to the cage for deflecting the flow of air so as to increase the speed of air incident upon the cage and rotor in proportion to increases in the angular deviation between the axis of the rotor and the general direction of the wind.

5. Apparatus according to claim 4 in which the airfoil surface comprises a substantially planar piece lying below the cage in a plane substantially perpendicular to the axis of the rotor.

6. Apparatus according to claim 5 in which the windvane also includes a pointer lying in the same general plane as the airfoil surface for aligning itself with the general direction of the wind.

7. Apparatus according to claim 6 in which the windvane also includes a vane extending upwardly away from the plane of the airfoil surface.

8. Apparatus according to claim 7 in which the leading edge of the vane has a swept-back profile extending away from the pointer.

9. Apparatus according to claim 1 including an elongated upright shaft aligned on a vertical rotor axis of rotation and terminating in a pointed bearing surface, the rotor being mounted to rotate about the axis through the shaft, and further including a cooperating thrust bearing in contact with the pointed bearing surface of the shaft to support the weight of the rotor.

10. Apparatus according to claim 9 including a pair of vertically spaced apart journal bearings between the shaft and the rotor for handling the aerodynamic loads imposed on the rotor.

11. Apparatus according to claim 9 including an elongated bore extending along the axis of rotation of the rotor, the thrust bearing being located in the bore, and in which the shaft is fitted inside the bore so that the thrust bearing is held in contact with the pointed bearing surface of the shaft.

12. Apparatus according to claim 9 in which the thrust bearing comprises a jewel bearing.

13. Apparatus according to claim 9 including a rotatable windvane attached to the cage, the windvane having an airfoil surface below the cage for deflecing the flow of air so as to increase the speed of the air incident upon the cage and rotor in proportion to the increases in angular deviation between the axis of the rotor and the direction of the wind.

14. Apparatus according to claim 13 in which the airfoil surface comprises a substantially planar piece lying in a plane substantially perpendicular to the axis of rotation of the rotor, a pointer lying in the same general plane as the planar airfoil surface to be aligned with the general direction of the wind, and at least one upright vane extending away from the planar airfoil surface.

15. Apparatus according to claim 14 including a pair of laterally spaced apart, substantially parallel vanes on the airfoil surface, the vanes being spaced substantially uniformly from the longitudinal axis of the pointer.

16. Apparatus according to claim 1 in which the ends of the vanes in the cage are connected to support means having surface areas which taper larger away from the cage to funnel air into the cage.

17. Apparatus according to claim 1 including a series of uniformly spaced apart vanes of uniform size arranged in a symmetrical pattern around the rotor.

18. An anemometer which includes a rotor mounted for rotation about a substantially vertical axis and having a frontal surface spaced from said axis for catching wind directed against it to cause the rotor to spin about its axis, whereby the speed with which the rotor spins can be converted into a signal proportional to airspeed, an elongated substantially vertically disposed shaft aligned on the rotor axis of rotation and terminating in a pointed bearing surface, the rotor being mounted to rotate about said vertical axis through the shaft, a thrust bearing carried in the rotor, the thrust bearing being in contact with the pointed bearing surface of the shaft to support the weight of the rotor, and journal bearing means for handling the aerodynamic loads imposed on the rotor substantially independently of the weight of the rotor, the journal bearing means surrounding the shaft to the journal the rotor for rotation about the vertical shaft.

19. Apparatus according to claim 18 including a pair of vertically spaced apart journal bearings for handling the aerodynamic loads imposed on the rotor.

20. Apparatus according to claim 19 in which the shaft has a cross-sectional shape to provide several points of contact, per revolution of the rotor, between the shaft and the journal bearings.

21. Apparatus according to claim 20 in which the portions of the shaft in the journal bearings are triangular in cross-section.

22. An anemometer which includes a rotor mounted for rotation about an axis and having a frontal surface spaced from said axis for catching wind directed against it to cause the rotor to spin about its axis, whereby the speed with which the rotor spins can be converted into a signal proportional to airspeed, and a windvane mounted for rotation adjacent to the rotor, the windvane having an airfoil surface for deflecting the flow of air so as to increase the speed of the air incident upon the rotor in proportion to increase in the angular deviation between the axis of the rotor and the direction of the wind.

23. Apparatus according to claim 22 in which the airfoil surface comprises a substantially planar piece lying in a plane substantially perpendicular to the axis of the rotor.

24. Apparatus according to claim 22 in which the windvane also includes a pointer lying in the same general plane as the airfoil surface to be aligned with the general direction of the wind.

25. Apparatus according to claim 24 in which the windvane also includes a pair of laterally spaced apart and substantially parallel vanes extending away from the planar airfoil surface, the vanes being spaced apart substantially uniformly from the longitudinal axis of the pointer.

26. Apparatus according to claim 25 in which the leading edges of the vanes have a swept-back profile extending away from the pointer.

27. An anemometer for use in measuring airspeed comprising a rotor mounted to spin about an axis extending substantially perpendicularly to the direction of normal air flow, the rotor having a frontal surface spaced from its axis of rotation and also extending substantially perpendicularly to the direction of normal air flow for catching the incident air flow to spin the rotor about its axis, whereby the speed with which the rotor spins can be converted into a signal proportional to the air speed, and a cage mounted so it surrounds the rotor, the cage having a plurality of spaced apart vanes located about its periphery, the vanes being spaced from the rotor and extending substantially perpendicularly to the direction of normal air flow to deflect the flow of air incident upon them to produce an asymmetrical air flow pattern across the rotor frontal surface of cause the rotor to spin about its axis.

28. Apparatus according to claim 27 in which the vanes are oriented with respect to the normal direction of air flow so that air incident upon the vanes is deflected independently of the direction of the flow thereof.

29. Apparatus according to claim 27 including an elongated vertically extending shaft aligned on the rotor axis of rotation and terminating in a pointed bearing surface, the rotor being mounted to rotate about the axis through the shaft, and further including a thrust bearing in contact with the pointed bearing surface of the shaft to support the weight of the rotor.

30. Apparatus according to claim 29 including journal bearing means disposed between the rotor and the vertical shaft for handling the aerodynamic loads imposed on the rotor substantially independently of the weight of the rotor.

31. Apparatus according to claim 30 including an elongated bore extending along the axis of rotation of the rotor, the thrust bearing being located in the bore, and in which the shaft is fitted inside the bore so that the thrust bearing is held in contact with the pointed bearing surface of the shaft.

32. Apparatus according to claim 30 including a windvane attached to the cage, the windvane having an airfoil surface located below the cage for deflecting the flow of air so as to alter the speed of air incident upon the cage and rotor in proportion to changes in the angular deviation between the axis of the rotor and the general direction of wind in the vertical plane.

33. Apparatus according to claim 27 including a windvane attached to the cage, the windvane having an airfoil surface located below the cage for deflecting the flow of air so as to alter the speed of air incident upon the cage and rotor in proportion to changes in the angular deviation between the axis of the rotor and the general direction of wind in the vertical plane.

* * * * *

UNITED STATES PATENT AND TRADEMARK OFFICE
CERTIFICATE OF CORRECTION

PATENT NO. : 4,078,426
DATED      : March 14, 1978
INVENTOR(S): JOHN R. CASANI and EDWIN POUNDER It is certified that error appears in the above-identified patent and that said Letters Patent are hereby corrected as shown below:

```
Col. 2, line  7,  "cup" should read -- cups --;
        line 10,  after "be" insert -- a --.
Col. 8, line 28,  "deflecing" should read -- deflecting --.

Col. 9, line 20,  "increase" should read -- increases --.

Col.10, line  8,  "of" should read -- to --.
```

Signed and Sealed this

Twenty-ninth Day of January 1980

[SEAL]

Attest:

SIDNEY A. DIAMOND

Attesting Officer

Commissioner of Patents and Trademarks